United States Patent
Hu et al.

(10) Patent No.: US 8,652,318 B2
(45) Date of Patent: Feb. 18, 2014

(54) OLEOPHOBIC SURFACE COATINGS

(75) Inventors: Nan-Xing Hu, Oakville (CA); Yu Qi, Oakville (CA); Peter G. Odell, Mississauga (CA); Raymond Wong, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 275 days.

(21) Appl. No.: 12/780,366

(22) Filed: May 14, 2010

(65) Prior Publication Data

US 2011/0279516 A1      Nov. 17, 2011

(51) Int. Cl.
  *C23C 28/00*  (2006.01)
  *C25D 5/34*  (2006.01)
  *C25D 11/00*  (2006.01)

(52) U.S. Cl.
  USPC ............................ 205/188; 205/205; 205/317

(58) Field of Classification Search
  USPC ......................................... 205/188, 205, 317
  See application file for complete search history.

(56) References Cited

U.S. PATENT DOCUMENTS

| | | |
|---|---|---|
| 5,221,335 A | 6/1993 | Williams et al. |
| 5,621,022 A | 4/1997 | Jaeger et al. |
| 5,939,206 A | 8/1999 | Kneezel et al. |
| 6,432,348 B1 | 8/2002 | Yamanaka |
| 6,598,954 B1 | 7/2003 | Moffat et al. |
| 7,553,011 B2 | 6/2009 | Odell et al. |
| 7,559,639 B2 | 7/2009 | Belelie et al. |
| 7,625,956 B2 | 12/2009 | Odell et al. |
| 7,632,546 B2 | 12/2009 | Odell et al. |
| 7,699,922 B2 | 4/2010 | Sternby |
| 2007/0123606 A1 | 5/2007 | Toma et al. |
| 2008/0297563 A1 | 12/2008 | Souma et al. |
| 2009/0046125 A1 | 2/2009 | Nystrom et al. |

FOREIGN PATENT DOCUMENTS

EP        1754731 A1 *   2/2007   ............ C08F 293/00

OTHER PUBLICATIONS

Darmanin et al., "Fluorophobic Effect for Building Up the Surface Morphology of Electrodeposited Substituted Conductive Polymers", Langmuir (no month, 2009), vol. 25, No. 10, pp. 5463-5466.*
Nicolas, "Acids and Alkali Resistant Sticky Superhydrophobic Surfaces by One-Pot Electropolymerization of Perfluoroalkyl Alkyl Pyrrole", J. of Colloid and Interface Science (no month, 2010), vol. 343, pp. 608-614.*
Nicolas et al. "Synthesis and Properties of New Fluorinated Ester, Thioester, and Amide Substituted Polythiophenes. Towards Superhydrophobic Surfaces", J. of Polymer Science: Part A: Polymer Chemistry (no month, 2007), vol. 45, pp. 4707-4719.*
Darmanin et al., "Molecular Design of Conductive Polymers to Modulate Superoleophobic Properties", J. Am. Chem. Soc. (no month, 2009), vol. 131, No. 22, pp. 7928-7933.*
Torres et al., "Electrosynthesis of Polypyrrole in a Nematic Liquid Crystal", Chem. Mater. (no month, 1992), vol. 4, pp. 583-588.*
Robitaille et al., "Synthesis, Characterization, and Langmuir-Blodgett Films of Fluorinated Polythiophene", Macromolecules (no month, 1994), vol. 27, No. 7, pp. 1847-1851.*

(Continued)

*Primary Examiner* — Edna Wong
(74) *Attorney, Agent, or Firm* — Oliff PLC

(57) ABSTRACT

A process for fabricating oleophobic surface coatings to be deposited on a metal surface, such as the front-face or aperture plate of piezoelectric print heads and transfix rolls. The surface coatings are applied to the surface by electrochemical polymerization.

16 Claims, 1 Drawing Sheet

(56) References Cited

OTHER PUBLICATIONS

Brito et al., "Adsorption of 3-mercaptopropyltrimethoxysilane and 3-aminopropyltrimethoxysilane at Platinum Electrodes", J. of Electroanal. Chem. (no month, 2002), vol. 520, pp. 47-52.*

Zhang et al., "Structural Analysis and Environmental Stability of Polyfluorinated Group Substituted Polythiophenes", Chinese Journal of Polymer Science (no month, 1996), vol. 14, No. 4, pp. 330-337.*

Darmanin et al., "Molecular Design of Conductive Polymers to Modulate Superoleophobic Properties", J. Am. Chem. Soc. (no month, 2009), vol. 131, pp. 7928-7933.*

Darmanin et al., "Fluorophobic Effect for Building Up the Surface Morphology of Electrodeposited Substituted Conductive Polymers", Langmuir (no month, 2009), vol. 25, No. 10, pp. 5463-5466).*

Nicolas, "Fabrication of Superhydrophobic Surfaces by Electropolymerization of Thiophene and Pyrrole Derivatives", Journal of Adhesion Science and Technology (no month, 2008), vol. 22, pp. 365-377.*

Dec. 20, 2011 Search Report issued in German Application No. 10 2011 075 292.7 (with partial translation).

U.S. Appl. No. 12/272,347, filed Nov. 17, 2008 in the name of Farrugia et al.

Darmanin et al.; "Molecular Design of Conductive Polymers to Modulate Superoleophobic Properties;" *J. Am. Chem. Soc.*; 2009, vol. 131; pp. 7928-7933.

Tuteja et al.; "Designing Superoleophobic Surfaces;" *Science*; 2007; vol. 318, pp. 1618.

Darmanin et al.; "Flurophobic Effect for Building up the Surface Morphology of Electrodeposited Substituted Conductive Polymers;" *Langmuir Letter*; vol. 25, No. 10; pp. 5463-5466; (2009).

Canadian Office Action dated Jul. 11, 2012 from Canadian Patent Application No. 2,739,415.

Bettayeb et al., *Small-molecule inducers of Aβ-42 peptide production share a common mechanism of action*, FASEB J fj.12-212985; published ahead of print Sep. 12, 2012, doi:10.1096/fj.12-212985.

Canadian Office Action dated Jun. 3, 2013 from Canadian Patent Application No. 2,739,415.

\* cited by examiner

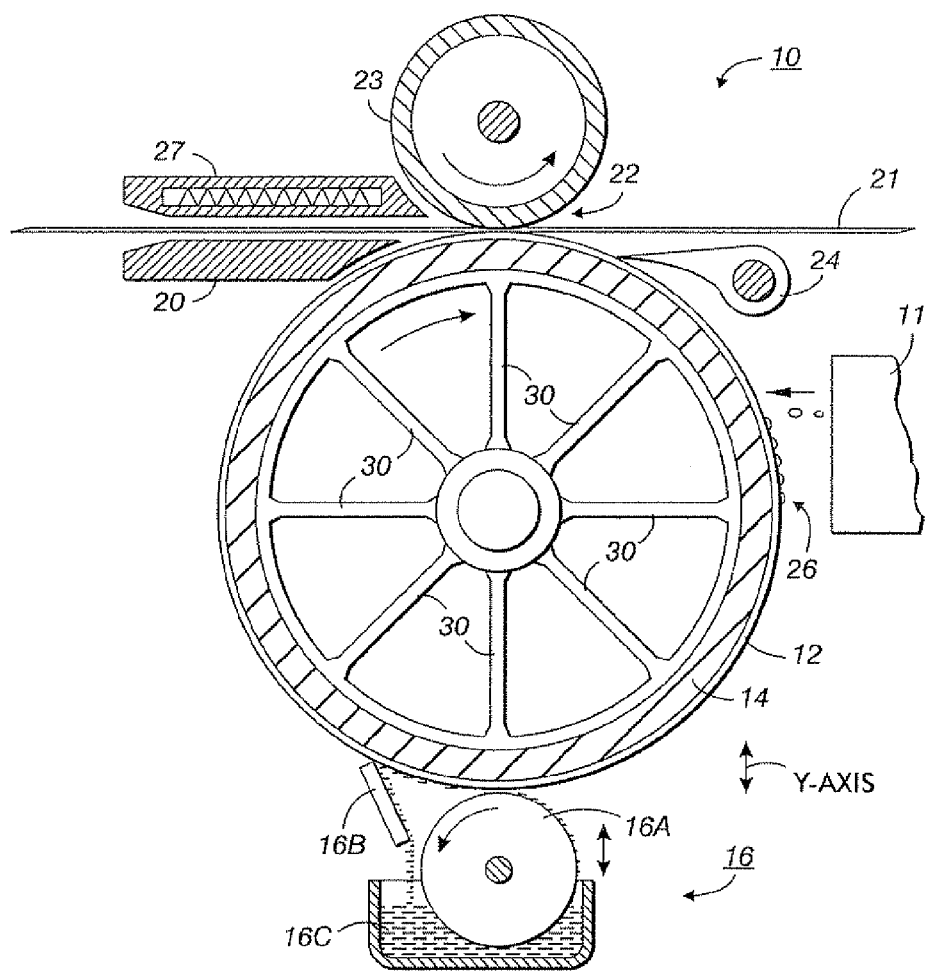

OLEOPHOBIC SURFACE COATINGS

BACKGROUND

The present disclosure relates to surface coatings, particularly surface coatings for the front-face or aperture plate of piezoelectric print heads. More specifically, the present disclosure relates to oleophobic surface coatings comprised of polypyrroles containing a fluoroalkyl moiety to be applied to conductive surfaces or metal surfaces, such as the front-face or aperture plate of piezoelectric print heads and image transfix rolls or belts.

Liquid ink jet systems typically include one or more printheads having a plurality of ink jets from which drops of fluid are ejected towards a recording medium. The ink jets of a printhead receive ink from an ink supply chamber or manifold in the printhead, which, in turn, receives ink from a source, such as a melted ink reservoir or an ink cartridge. Each ink jet includes a channel having one end in fluid communication with the ink supply manifold. The other end of the ink channel has an orifice or nozzle for ejecting drops of ink. The nozzles of the ink jets may be formed in an aperture or nozzle plate that has openings corresponding to the nozzles of the ink jets. During operation, drop-ejecting signals activate actuators in the ink jets to expel drops of fluid from the ink jet nozzles onto the recording medium. By selectively activating the actuators of the ink jets to eject drops as the recording medium and/or printhead assembly are moved relative to one another, the deposited drops can be precisely patterned to form particular text and graphic images on the recording medium. An example of a full width array printhead is described in U.S. Patent Publication No. 2009/0046125, which is hereby incorporated by reference herein in its entirety.

In general, inks for ink jet printing may include, for example, aqueous inks and non-aqueous inks. An example of non-aqueous inks includes phase change inks (sometimes referred to as "hot melt inks"), which exist in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks for color printing typically comprise a phase change organic phase change carrier composition, which is combined with a phase change ink compatible colorant.

Illustrative examples of suitable colorants can include dyes or pigments, as disclosed in, for example, U.S. Pat. No. 5,221,335, the disclosure of which is totally incorporated herein by reference.

U.S. Pat. No. 5,621,022, the disclosure of which is totally incorporated herein by reference, discloses the use of a specific class of polymeric dyes in phase change ink compositions. Further, U.S. Pat. No. 7,699,922, the disclosure of which is totally incorporated herein by reference, discloses organic phase change inks containing nanoparticles.

Suitable inks for inkjet printing can also include ultraviolet curable inks. The examples of ultra-violet curable gel inks, which can be jetted in such a printhead, are described in U.S. Pat. Nos. 7,632,546; 7,625,956; 7,559,639; and 7,553,011; and U.S. Patent Application Publication No. 2007/0123606, each of which are totally incorporated by reference herein in their entireties.

One difficulty faced by fluid ink jet systems is wetting, drooling or flooding of inks onto the printhead front face. Such contamination of the printhead front face can cause or contribute to blocking of the ink jet nozzles and channels, which alone or in combination with the wetted, contaminated front face, can cause or contribute to non-firing or missing drops, undersized or otherwise wrong-sized drops, satellites, or misdirected drops on the recording medium and thus result in degraded print quality.

Conventional printhead front face coatings are typically sputtered polytetrafluoroethylene coatings. When the printhead is tilted, the UV gel ink, at a temperature of about 75° C. (75° C. representing a typical jetting temperature for UV gel ink), and the solid ink, at a temperature of about 105° C. (105° C. representing a typical jetting temperature for solid ink), do not readily slide on the printhead front face surface. Instead, these inks flow along the printhead front face and leave an ink film or residue on the printhead, which can interfere with jetting. For this reason, the front faces of UV and solid ink printheads are prone to becoming contaminated by UV and solid inks, for example. In some cases, the contaminated printhead can be refreshed or cleaned with a maintenance unit. However, such an approach introduces system complexity, additional hardware costs, and can lead to reliability issues.

Thus, there remains a need for materials and methods for preparing devices having oleophobic surface characteristics. Further, while currently available coatings for ink jet printhead front faces are suitable for their intended purposes, a need remains for an improved printhead front face design that reduces or eliminates wetting, drooling, flooding, or contamination of UV or solid ink over the printhead front face. There further remains a need for an improved printhead front face coating that is oleophobic and provides a known surface energy surface near the orifice exit.

SUMMARY

In embodiments, a method for preparing a device having an oleophobic polymer surface coating is described, the method comprising:

providing a conductive surface;

treating the conductive surface with a silane-containing composition to obtain a silane-containing composition thin layer;

providing an electrolyte solution comprising an electrolyte and a monomer; and performing an electrochemical polymerization on the treated conductive surface to provide the oleophobic polymer surface coating.

Further embodiments relate to a surface coating for a front-face or an aperture plate of a piezoelectric print head, the surface coating comprising an electrochemically deposited oleophobic polymer.

BRIEF DESCRIPTION OF THE DRAWING

The FIGURE is an illustration of an embodiment of a printing apparatus.

EMBODIMENTS

This disclosure is not limited to particular embodiments described herein, and some components and processes may be varied by one of skill, based on this disclosure. The terminology used herein is for the purpose of describing particular embodiments only, and is not intended to be limiting.

Definitions

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The terms "hydrocarbon" and "alkane" refer, for example, to branched and unbranched molecules having the general formula $C_nH_{2n+2}$, in which n is a number of 1 or more, such as of from about 1 to about 60. Exemplary alkanes include methane, ethane, n-propane, isopropane, n-butane, isobutane, tort-butane, octane, decane, tetradecane, hexadecane, eicosane, tetracosane and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "alkyl group", refers, for example, to hydrocarbon groups that are linear or branched, saturated or unsaturated, and cyclic or acyclic, and with from about 1 to about 50, such as from about 5 to about 35 or from about 6 to about 28 carbon atoms.

The term "fluoroalkyl group", refers, for example, to hydrocarbon groups that are linear or branched, saturated or unsaturated, and cyclic or acyclic, and with from about 1 to about 50, such as from about 5 to about 35 or from about 6 to about 28 carbon atoms, wherein one or more of the hydrogen atoms in the hydrocarbon group are substituted with a fluorine atom.

The term "perfluoroalkyl group", refers, for example, to hydrocarbon groups that are linear or branched, saturated or unsaturated, and cyclic or acyclic, and with from about 1 to about 50, such as from about 5 to about 35 or from about 6 to about 28 carbon atoms, wherein all of the hydrogen atoms in the hydrocarbon group are substituted with a fluorine atom.

The term "long-chain" refers, for example, to hydrocarbon chains in which n is a number of from about 8 to about 60, such as from about 20 to about 45 or from about 30 to about 40. The term "short-chain" refers, for example, to hydrocarbon chains in which n is a number of from about 1 to about 7, such as from about 2 to about 5 or from about 3 to about 4.

The term "curable" describes, for example, a material that may be cured via polymerization, including for example free radical routes, and/or in which polymerization is photoinitiated though use of a radiation-sensitive photoinitiator.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs. Similarly, the terms "two or more" and "at least two" refer, for example to instances in which two of the subsequently described circumstances occurs, and to instances in which more than two of the subsequently described circumstances occurs.

The term "oleophobic" as used herein can be described as referring to a physical property of a molecule relating to having a lack of a strong affinity for oils. Water and fluorocarbons can be examples of oleophobic compounds.

The term "highly oleophobic" as used herein can be described as when a droplet of hydrocarbon-based liquid, for example, hexadecane or ink, forms a high contact angle with a surface, such as a contact angle of from about 50° or greater than about 50° to about 100°.

The term "superoleophobic" as used herein can be described as when a droplet of hydrocarbon-based liquid, for example, hexadecane or ink, forms a high contact-angle with a surface, such as a contact angle that is greater than 100°, or from greater than about 100° to about 160°, or from greater than about 120° to about 160°.

The term "superoleophobic" as used herein can also be described as when a droplet of a hydrocarbon-based liquid, for example, hexadecane or ink, forms a sliding angle with a surface of from about 1° to less than about 30°, or from about 1° to less than about 25°, or a sliding angle of less than about 25°, or a sliding angle of less than about 15°, or a sliding angle of less than about 10°.

As a general matter, the wettability or spread of a liquid on a surface is governed by the forces of interaction between the liquid, the surface and the surrounding air, and in particular the surface free energy, as relating to the surface chemistry and surface topology.

Surface tension is a parameter that can be described as the interaction between the forces of cohesion and the forces of adhesion, which determines whether or not wetting, or the spreading of a liquid across a surface, occurs.

Young's equation, which defines the balance of forces caused by a wet drop on a dry surface, stipulates that:

$$\gamma_{SL} + \gamma_{LV} \cos \Theta = \gamma_{SV}$$

where $\gamma_{SL}$=forces of interaction between a solid and liquid,
$\gamma_{LV}$=forces of interaction between a liquid and surrounding air,
$\gamma_{SV}$=forces of interaction between a solid and surrounding air, and
$\Theta$=contact angle of the drop of liquid in relation to the surface Young's equation also shows that, if the surface tension of the liquid is lower than the surface energy, the contact angle is zero and the liquid wets the surface.

The surface energy depends on several factors, such as the chemical composition and crystallographic structure of the solid, and in particular of its surface, the geometric characteristics of the surface and its roughness, and the presence of molecules physically adsorbed or chemically bonded to the solid surface, which can easily mask the solid and significantly modify its surface energy.

In a given system, the surface energy is often determined based on the last atomic or molecular layer applied to the surface. The chemical nature of the underlying coated solid part is typically of minimal importance in relation to the state of its surface and the layer(s) or contamination covering it.

To prevent wetting of liquids with low surface tension, such as oils and wax-based inks, there is required the surface tension of the solid to be extremely low. Therefore, there currently exist very few approaches to form an oleophobic or superoleophobic surface, which typically involves special design of re-entrant surface curvature covered with fluorinated surface materials (see e.g. Cohen et al *Science* 2007, 318, 1618-1622).

However, the fabrication of such sophisticated surface structures is expensive and laborious, requiring numerous post-treatment steps. Therefore, a process for obtaining an oleophobic or superoleophobic surface coating in an efficient and cost-effective manner for use on, for example, metal surfaces, such as the front-face or aperture plate of piezoelectric print heads and transfix rolls, would be useful.

Electrochemical Polymerization

The electrochemical polymerization of pyrrole or a mixture of a pyrrole with comonomers has been disclosed (see, e.g. Guittard et al, *J. Am. Chem. Soc.* 2009, 7928-7933). In this procedure, pyrrole or the pyrrole/comonomer mixture is electrolyzed in an electrolyte solvent in the presence of a conductive salt, the pyrrole polymers being formed as a result of anodic oxidation and being deposited on the anode.

The present disclosure relates to a method for preparing a device having an oleophobic polymer surface coating, the method comprising providing a conductive surface; treating the conductive surface with a silane-containing composition to obtain a silane-containing composition thin layer; providing an electrolyte solution comprising an electrolyte and a monomer; and performing an electrochemical polymerization on the treated conductive surface to obtain an oleophobic polymer surface coating.

The present disclosure further relates to the electrochemical polymerization of a pyrrole containing a fluoroalkyl group, such as an N-fluoroalkylpyrrole, as a monomer in standard electrochemical conditions. In embodiments, the electrochemical polymerization can be conducted at temperatures ranging from approximately 20° C. up to about 100° C.

In embodiments, the oleophobic coating is deposited onto the substrate by performing an electrochemical polymerization reaction on the treated conductive surface by immersing the surface into the electrolyte solution in a two-electrode cell under, for example, a constant current.

In embodiments, the oleophobic surface coating exhibits a nano-porous structure, which offers extremely low surface free energy as demonstrated by contact angle measurement. In embodiments, the oleophobic surface coating comprises a plurality of pores with an average size ranging from about 0.025 μm to about 3 μm, or from about 0.5 μm to about 2 μm, or from about 0.75 μm to about 1.80 μm.

A device having an oleophobic surface coating, according to the present disclosure, is prepared by first obtaining a substrate having a conductive surface.

Conductive Surface

In embodiments, a conductive surface can be provided by a conductive substrate, such as a conductive metal, a conductive metal oxide, or a conductive polymer, or by applying a conductive surface layer to a non-conductive substrate such as a plastic film substrate. Illustrative examples of suitable conductive surface layers include layers that are made from conductive materials such as a metal, a conductive polymer, a metal alloy or composite, conductive carbon, or a conductive composite comprised of conductive carbons, such as carbon nanotubes or graphene.

Illustrative examples of suitable metal substrates or metals for a conductive surface layer include, for example, Al, Ag, Au, Pt, Pd, Cu, Fe, Co, Cr, In, and Ni, particularly the transition metals, for example, Ag, Au, Pt, Pd, Cu, Cr, Ni, and mixtures thereof.

Illustrative examples of suitable metal oxides for substrates include zinc oxide, aluminum-titanium oxide (ATO), aluminum oxide, silicon oxide, silicon nitride, barium titanate, barium zirconium titanate, ceramics, and the like.

Illustrative examples of suitable electrically conductive polymer materials for substrates include polypyrrole, polythiophene, polyaniline, and the like.

Illustrative examples of suitable metal alloys or composites include Au—Ag, Ag—Cu, Ag—Ni, Au—Cu, Au—Ni, Au—Ag—Cu, and Au—Ag—Pd, although not limited.

Illustrative examples of suitable conductive composites comprised of conductive carbons include single walled carbon nanotubes, multi-walled carbon nanotubes, graphene and the like. Other examples of conductive composites may include carbon nanotubes/metal composites.

With respect to carbon nanotubes, there are two general types of carbon nanotubes: multi-walled carbon nanotubes (MWNTs) and single-walled carbon nanotubes (SWNTs). SWNTs have a cylindrical sheet-like, one-atom-thick shell of hexagonally-arranged carbon atoms, and carbon nanotubes are typically composed of multiple coaxial cylinders of ever-increasing diameter about a common axis. Thus, SWNTs can be considered to be the structure underlying carbon nanotubes and also carbon nanotube ropes, which are uniquely-arranged arrays of SWNTs. In the present disclosure, "multi-walled carbon nanotubes (MWNTs)" are also referred to as "carbon nanotubes (CNTs)" and "nanotubes."

An example of a carbon nanotube is described in U.S. patent application Ser. No. 12/272,347, filed on Nov. 17, 2008, now abandoned, the disclosure of which is hereby incorporated by reference herein in its entirety.

As mentioned above, in the case of a non-conductive substrate, such as a plastic film substrate, a conductive surface layer is applied to the surface of the non-conductive substrate in order to obtain a conductive surface.

Illustrative examples of suitable plastic film substrates include polyimide film, polyethylene naphthalate film, polyethylene terephthalate film, polyethersulfone, polyetherimide, and the like, or a combination thereof; although not limited. In embodiments, the substrate can be made from a heat-resistant resin. Illustrative examples of suitable heat-resistant resins include resins having high heat resistance and high strength such as a polyimide, an aromatic polyimide, polyether imide, polyphthalamide, polyester, and a liquid crystal material such as a thermotropic liquid crystal polymer and the like.

In embodiments, the substrate can be any suitable thickness, such as from about 5 micrometers to about 1000 micrometers, or from about 10 micrometers to about 500 micrometers.

In further embodiments, the oleophobic surface coating can be disposed on an inkjet printhead as a suitable conductive substrate, such as onto an aperture plate of piezoelectric print heads.

In embodiments, the printhead aperture plate (or orifice plate or print head front face plate) can be made of any suitable material and can be of any configuration suitable to the device. Orifice plates of square or rectangular shapes are typically selected due to ease of manufacture. Orifice plates can be made of any suitable composition. In embodiments, aperture plates or orifice plates are composed of stainless steel, steel, nickel, copper, aluminum, polyimide, or silicon. Orifice plates can also be made of stainless steel selectively plated with a braze material such as gold.

FIGURE is a diagram of one embodiment of an image forming apparatus 10 in which the disclosed oleophobic surface coatings can be employed. The image forming apparatus includes a printhead 11 that is appropriately supported for moving utilization to emit drops 26 of ink onto an intermediate transfer surface 12 applied to a supporting surface of a print drum 14 that is rotatable about an axis of rotation that is parallel to an X-axis that is orthogonal to the plane of FIGURE. The ink can be melted solid or phase change ink, for example, and the print drum 14 can be heated.

Illustrative examples of suitable inks include aqueous and non-aqueous inks. In embodiments, the non-aqueous ink comprises a colorant and a ink vehicle selected from the group consisting of polyethylene waxes, polymethylene waxes, dimer acid based tetra-amide, monoamides, stearyl stearamide, urethane isocyanate-derived materials, a urea isocyanate-derived materials, a urethane/urea isocyanate-derived materials, polyesters, (meth)acrylate monomers, diol diacrylate monomers, diol dimethacrylate monomers, epoxy acrylate oligomers, polyester acrylate oligomers, polyurethane acrylate oligomers, and mixtures thereof.

The intermediate transfer surface 12 can be a liquid layer such as functional oil that can be applied by contact with an applicator such as a roller 16A of an applicator assembly 16.

By way of illustrative example, the applicator assembly 16 can include a housing 16C that supports the roller 16A and a metering blade 16B. The housing 16C can function as a reservoir for containing the liquid that is removed from the print drum by the metering blade. The applicator assembly 16 can be configured for selective engagement with the print drum 14.

The image forming apparatus 10 further includes a substrate guide 20 and a media preheater 27 that guides a print media substrate 21, such as paper, through a nip 22 formed between opposing actuated surfaces of a transfer roller 23 and the intermediate transfer surface 12 supported by the print drum 14. The transfer roller is selectively movable into contact with the intermediate transfer surface 12. Stripper fingers 24 can be pivotally mounted to assist in removing the print medium substrate 21 from the intermediate transfer surface 12 after an image 26 comprising deposited ink drops is transferred to the print medium substrate 21.

Thin Layer of a Silane-Containing Composition

Once a conductive surface is obtained, a thin layer of a silane-containing composition is then deposited onto desired areas of the conductive surface of the substrate by any suitable method, such as by spray or dip-coating.

As a silane-containing composition, illustrative examples of a suitable silane-containing composition include a composition comprising a hydrolytic silane selected from the group consisting of aminoalkylsilanes, a mercaptoalkyl-silane, a silane-containing pyrrole, and mixtures thereof, although not limited.

Illustrative examples of suitable alkoxysilanes with amino functional groups include 2-aminoethyltrimethoxysilane, 2-aminoethyltriethoxysilane, 2-aminoethyltributoxysilane, 2-aminoethyltripropoxysilane, aminoethyltrimethoxysilane, aminoethyltriethoxysilane, aminomethyltriethoxysilane, 3-aminopropyltrimethoxysilane, 3-aminopropyltriethoxysilane, 3-aminopropyltributoxysilane, 3-aminopropyltripropoxysilane, 2-aminopropyltrimethoxysilane, 2-aminopropyltriethoxysilane, 2-aminopropyltripropoxysilane, 2-aminopropyltributoxysilane, 1-aminopropyltrimethoxysilane, 1-aminopropyltriethoxysilane, 1-aminopropyltributoxysilane, 1-aminopropyltripropoxysilane, N-aminomethylaminoethyltrimethoxysilane, N-aminomethylaminomethyltripropoxysilane, N-aminomethyl-2-aminoethyltrimethoxysilane, N-aminomethyl-2-aminoethyltriethoxysilane, N-aminomethyl-2-aminoethyltripropoxysilane, N-aminomethyl-3-aminopropyltrimethoxysilane, N-aminomethyl-3-aminopropyltriethoxysilane, N-aminomethyl-3-aminopropyltripropoxysilane, N-aminomethyl-2-aminopropyltriethoxysilane, N-aminomethyl-2-aminopropyltripropoxysilane, N-aminopropyltrimethoxysilane, N-(2-aminoethyl)-2-aminoethyltrimethoxysilane, N-(2-aminoethyl)-2-aminoethyltriethoxysilane, N-(2-aminoethyl)-2-aminoethyltripropoxysilane, N-(2-aminoethyl)-aminoethyltriethoxysilane, N-(2-aminoethyl)-aminoethyltripropoxysilane, N-(2-aminoethyl)-2-aminopropyltrimethoxysilane, N-(2-aminoethyl)-3-aminopropyltriethoxysilane, N-(2-aminoethyl)-3-aminopropyltripropoxysilane, N-(2-aminoethyl)-3-aminopropyltrimethoxysilane, N-(2-aminoethyl)-2-aminopropyltriethoxysilane, N-(2-aminoethyl)-2-aminopropyltripropoxysilane, N-(2-aminopropyl)-2-aminoethyltrimethoxysilane, N-(3-aminopropyl)-2-aminoethyltriethoxysilane, N-(3-aminopropyl)-2-aminoethyltripropoxysilane, N-methylaminopropyltriethoxysilane, N-methylaminopropyltrimethoxysilane, 2-aminopropylmethyldiethoxysilane, 3-diethylenetriaminopropyltriethoxysilane, N-(2-aminoethyl)-3-aminoisobutyl-methyldiethoxysilane, (aminoethylaminomethyl)phenethyl-trimethoxysilane, (aminoethylaminomethyl)phenethyl-triethoxysilane, (aminoethylaminomethyl)phenethyl-dimethoxymethylsilane, 3-(amonophenoxy)propyltrimethoxysilane, 3-(amonophenoxy)propyltriethoxysilane, 3-(amonophenoxy)propyldimethoxymethylsilane, aminophenyltrimethoxysilane, aminophenyltriethoxysilane, aminophenyldimethoxymethylsilane, aminophenyldiethoxymethylsilane, mixtures thereof, and the like.

Illustrative examples of suitable alkoxysilanes with mercapto functional groups include 3-mercaptopropyltrimethoxysilane, 3-mercaptopropyltriethoxysilane, 3-mercaptomethylmethyldiethoxysilane, 3-mercaptopropylmethyldimethoxysilane, mercaptomethylmethyldiethoxysilane, [3-triethoxysilyl]propyl]-disulfide, [3-trimethoxysilyl]propyl]-disulfide, [3-diethoxymethylsilyl]propyl]-disulfide bis[3-triethoxysilyl]propyl]-tetrasulfide, [3-diethoxymethylsilyl]propyl]-tetrasulfide, [3-trimethoxysilyl]propyl]-tetrasulfide, mixtures thereof, and the like. In addition, examples of suitable silane-containing pyrrole include:

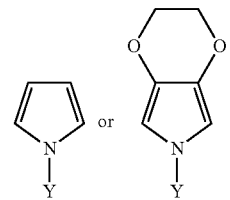

Y is a substituent comprising a silane moiety. Illustrative examples of Y include 3-methyldimethoxysilypropyl, 3-methyldiethoxysilypropyl, 3-trimethoxysilypropyl, 3-triethoxysilypropyl and the like.

In embodiments, the silane-containing composition thin layer can be of any suitable thickness. In embodiments, the silane-containing composition thin layer can be deposited onto the substrate at a thickness of from about 25 to about 5,000 nanometers, or about 3,000 nanometers.

Oleophobic Surface Coating

Once the thin layer of a silane-containing composition is applied to the surface of the conductive surface, an electrolyte solution comprising an electrolyte and a monomer is provided to perform electrochemical polymerization on the surface of the substrate device in order to obtain an oleophobic surface coating.

In embodiments, the monomer can be selected from the group consisting of:

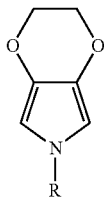
(I)

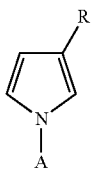
(II)

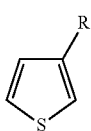
(III)

and mixtures thereof, where R represents a substituent containing a fluoroalkyl or a perfluoroalkyl moiety; and A represents a hydrogen or an alkyl group.

Illustrative examples of suitable electrolytes include ion-conductive salts such as alkali metal and ammonium or phosphonium salts containing anions from the group consisting of $BF_4^-$, $AsF_6^-$, $SbF_6^-$, $PF_6^-$, $SbCl_6^-$, $ClO_4^-$, $HSO_4^-$, and $SO_4^{2-}$. In further embodiments, tetraalkylammonium salt can be used as the electrolyte.

In embodiments, the electrolytes are partially or completely incorporated in the resulting polymers and impart high electrical conductivity of up to about $10^2$ $Ohm^{-1}$ $cm.^{-1}$ to the polymers prepared by the process of electrochemical polymerization according to the present disclosure.

In embodiments, the electrochemical polymerization can be performed in a two-electrode cell containing anhydrous acetonitrile solutions of 0.01M N-fluoroalkylpyrrole as a monomer and 0.1 M tetrabutylammonium hexafluorophosphate ($Bu_4NPF_6$ serving as electrolyte) under a constant current.

In embodiments for preparing a poly(N-fluoroalkylpyrrole) coating, an N-fluoroalkyl-substituted 3,4-ethylenedioxypyrole monomer can be provided.

In embodiments, the oleophobic polymer comprises a fluoropolymer composition comprising a repeat unit selected from the group consisting of:

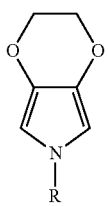
(I)

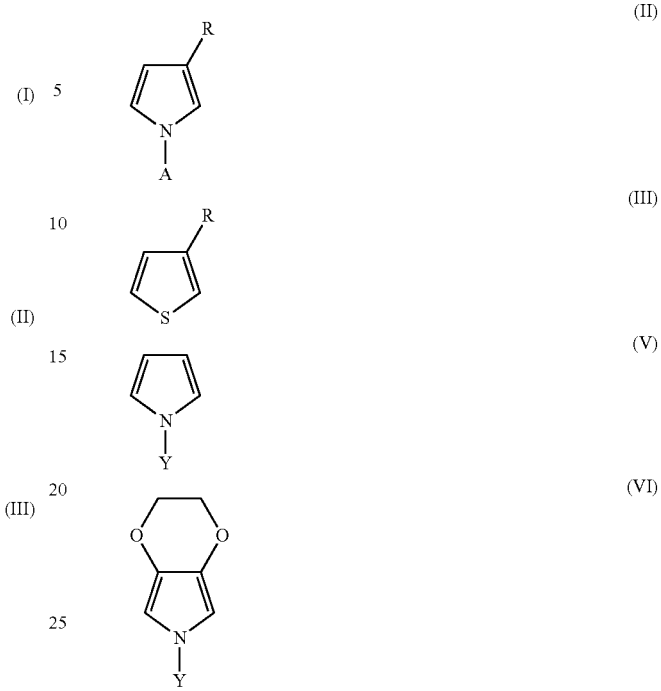

and mixtures thereof, wherein R is a substituent selected from the group consisting of hydrogen, an alkyl, a fluoroalkyl, a perfluoroalkyl, a fluoroalkoxyl, $—(CH2)_x-L-(CH2)_yCnF_{2n+1}$;

L is a divalent linkage of an ether or an ester, x and y independently represent an integer of between 0 to about 6, n is an integer of from 1 to about 20;

A is substituent selected from the group consisting of hydrogen, an alkyl group, and a fluoroalkyl; and Y is a substituent comprising a silane moiety.

In embodiments, the oleophobic polymer can comprise poly(N-fluoroalkylpyrrole).

In embodiments according to the present disclosure, the oleophobic surface coating is very "ink phobic" and has the surface properties very desirable for the front face of inkjet printheads, for example, high contact angle with ink for super de-wetting and high holding pressure and low sliding angle for self clean and easy clean. Generally, the greater the ink contact angle, the better or higher the holding pressure. Holding pressure measures the ability of the aperture plate to avoid ink weeping out of the nozzle opening when the pressure of the ink tank (reservoir) increases.

In embodiments, the surface coating comprised of polypyrrole containing a fluoroalkyl moiety, such as poly(N-fluoroalkylpyrrole) possesses oleophobic properties. The degree of oleophobicity of the coating surface can be estimated by a contact angle, which is formed by the coating surface and the tangent to the surface of a liquid droplet, such as hexadecane, at the contact point. In embodiments, the surface coating disclosed herein may possess a contact angle with hexadecane of from about 50 to about 140 degrees, or from about 55 to about 100 degrees.

In embodiments, the surface coating in accordance with the present disclosure can be disposed on the printhead front face along the plate and provides a known surface energy surface near the orifice exit.

This disclosure will be illustrated further in the following Example.

EXAMPLES

A polyimide substrate (KAPTON® film from DuPont Chemical Co. Wilmington, Del.) was treated by cleaning with detergent solution and etching with alkali hydroxide solution, followed by treatment with an aminosilane coupling agent. Using a dip-coating technique, the substrate was then coated with a silver nanoparticle dispersion. The silver nanoparticle dispersion coating was obtained by adding 0.1 parts of 3-aminopropyltrimethoxysilane to a mixture of 1.5 parts of hexadecylamine stabilized silver nanoparticles (such as the ones as disclosed in U.S. patent application Ser. No. 12/408,897 filed on Mar. 23, 2009, now U.S. Pat. No. 8,207,251) and 8.5 parts of toluene, followed by annealing at 150 degree C. for 10 min, to form a thin silver metal layer on the polyimide substrate with an electrical conductivity of about $2.5 \times 10^4$ S/cm.

An oleophobic surface coating was then applied to the Ag-deposited substrate by electrochemical polymerization of an N-fluoroalkyl-substituted pyrrole in an acetronitrile solution containing 0.01 M of monomer and 0.15 M tetrabutylammonium hexafluorophosphate, according to a known procedure (such as the one disclosed in, for example, Guittard et al, *J. Am. Chem. Soc.* 2009, 7928-7933).

The oleophobic properties of the poly(N-fluoroalkylpyrrole) surface coating can be estimated by contact angle measurement with hexadecane liquid. By selecting the proper monomer and electrochemical polymerization conditions as described herein, a surface coating with high contact angle of, for example, over 60 degrees can be obtained.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for preparing a device having an oleophobic polymer surface coating, the method comprising:
   providing a conductive surface;
   treating the conductive surface with a silane-containing composition to obtain a silane-containing composition thin layer;
   providing an electrolyte solution comprising an electrolyte and a monomer; and
   performing an electrochemical polymerization on the treated conductive surface with the electrolyte solution to provide the oleophobic polymer surface coating,
   wherein the monomer is selected from the group consisting of:

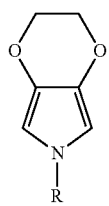

(I)

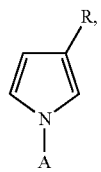

(II)

and mixtures thereof;
   wherein R is a substituent selected from the group consisting of a fluoroalkyl, a perfluoroalkyl, a fluoroalkoxyl, and $-(CH_2)_x-L-(CH_2)_y C_n F_{2n+1}$, wherein L is a divalent linkage of an ether, x and y independently represent an integer of between 0 to about 6, n is an integer of from 1 to about 20; and
   A is a substituent selected from the group consisting of an alkyl and a fluoroalkyl.

2. The method of claim 1, wherein the silane-containing composition comprises a hydrolytic silane selected from the group consisting of an aminoalkylsilane, a mercaptoalkylsilane, a silane-containing pyrrole, and a mixture thereof.

3. The method of claim 1, wherein the oleophobic polymer surface coating comprises a fluoropolymer composition comprising a repeat unit selected from the group consisting of:

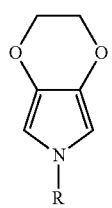

(I)

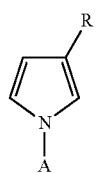

(II)

and mixtures thereof,
   wherein R is a substituent selected from the group consisting of a fluoroalkyl, a perfluoroalkyl, a fluoroalkoxyl, and $-(CH_2)_x-L-(CH_2)_y C_n F_{2n+1}$, wherein L is a divalent linkage of an ether, x and y independently represent an integer of between 0 to about 6, n is an integer of from 1 to about 20; and
   A is a substituent selected from the group consisting of an alkyl, and a fluoroalkyl.

4. The method of claim 1, wherein the electrolyte comprises a tetraalkylammonium salt.

5. The method of claim 1, wherein the step of performing an electrochemical polymerization comprises immersing the treated surface into the electrolyte solution in a two-electrode cell while maintaining a constant current.

6. The method of claim 1, wherein the surface coating comprises a nano-porous structure.

7. The method of claim 1, wherein the surface coating exhibits a contact angle of greater than 55 degrees with hexadecane.

8. The method of claim 1, wherein the conductive surface is disposed on a substrate selected from the group consisting of a polymer, a ceramic, and a metal oxide.

9. The method of claim 8, wherein the conductive surface comprises a metal, an alloy, conductive carbon, or a composite comprised of carbon nanotubes.

10. The method of claim 1, wherein the oleophobic polymer surface coating is chemically bonded with the conductive surface.

11. The method of claim 1, wherein the silane-containing thin layer has a thickness in the range of 25 to 5,000 nanometers.

12. The method of claim 1, wherein the device is selected from the group consisting of a front-face of a piezoelectric print head, an aperture plate of a piezoelectric print head and an image transfix roll.

13. The method of claim 1, wherein the monomer is

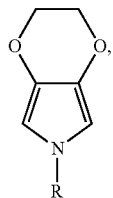

(I)

wherein R is a substituent selected from the group consisting of a fluoroalkyl, a perfluoroalkyl, a fluoroalkoxyl, and —$(CH_2)_x$-L-$(CH_2)_y C_n F_{2n+1}$, wherein L is a divalent linkage of an ether, x and y independently represent an integer of between 0 to about 6, n is an integer of from 1 to about 20.

14. The method of claim 13, wherein R is —$(CH_2)_x$-L-$(CH_2)_y C_n F_{2n+1}$, wherein L is a divalent linkage of an ether, x and y independently represent an integer of between 0 to about 6, n is an integer of from 1 to about 20.

15. The method of claim 1, wherein R is —$(CH_2)_x$-L-$(CH_2)_y C_n F_{2n+1}$, wherein L is a divalent linkage of an ether, x and y independently represent an integer of between 0 to about 6, n is an integer of from 1 to about 20.

16. The method of claim 1, wherein the monomer is

(II)

wherein R is a substituent selected from the group consisting of a fluoroalkyl, a perfluoroalkyl, a fluoroalkoxyl, and —$(CH_2)_x$-L-$(CH_2)_y C_n F_{2n+1}$, wherein L is a divalent linkage of an ether, x and y independently represent an integer of between 0 to about 6, n is an integer of from 1 to about 20; and A is a substituent selected from the group consisting of an alkyl and a fluoroalkyl.

* * * * *